RADIO RECEIVING SYSTEM

Filed July 1, 1955 2 Sheets-Sheet 1

INVENTORS
EDWIN L. CLARK &
FRANK T. KSIAZEK
BY
ATTORNEY

RADIO RECEIVING SYSTEM

Filed July 1, 1955

2 Sheets-Sheet 2

INVENTORS
EDWIN L. CLARK &
FRANK T. KSIAZEK
BY
[signature]
ATTORNEY

United States Patent Office 2,790,896

Patented Apr. 30, 1957

2,790,896

RADIO RECEIVING SYSTEM

Edwin L. Clark, Collingswood, and Frank T. Ksiazek, Pennsauken, N. J., assignors to Radio Corporation of America, a corporation of Delaware Application July 1, 1955, Serial No. 519,511

3 Claims. (Cl. 250—20)

The present invention relates to improvement in radio receiving systems and particularly to diode signal detecting circuits for use in such systems.

It is well known that the two electrode electron discharge device, known as the "diode," may be employed to demodulate or detect a modulated carrier wave signal. Experience has shown that in order to most efficiently utilize the conduction characteristics of the diode when employed in signal detection, the amplitude of the modulated radio carrier applied to the diode should be sufficient to drive the diode well into unilateral conduction or rectifying operation. It has also been found that in diode demodulation circuits there can frequently be found to exist a small but often overlooked current flow in the absence of impressed voltage or received radio signals sometimes called "zero impressed voltage current." This current flow, hereinafter referred to interchangeably or together as the "spurious" current or "no-signal" current of the circuit, represents a condition of electron flow within the diode from cathode to plate. This electron flow is attributable, at least in part, to the voltage difference in work functions of the materials comprising the cathode and plate as well as their relative temperatures. See a paper entitled "This Matter of Contact Potential" appearing in the Nov. 1936 issue of the I R E by K. M. Bowie. page 150, et seq.

No-signal current flow through the diode demodulation load circuit causes a characteristic "no-signal" potential to appear across the diode the magnitude of which may be considered a measure of the no-signal current conduction in the diode. In order to effect useful demodulation of received radio carrier signals the strength of received signal must be such that the signal delivered to the diode has a peak to peak amplitude well in excess of twice the value of the no-signal voltage across the diode or the load circuit. Only under these conditions will unilateral conduction in the diode be obtained and demodulation of the signal realized.

It, therefore, is found that the sensitivity, for example, of television receivers is often greatly reduced by this "spurious" or "no-signal" current of the diode and the resulting spurious voltage in the video demoduation circuit. In fringe areas and other regions of low signal strength, it is sometimes not possible to amplify received signals sufficiently to operate a diode detector without increasing the cost of the receiver.

Moreover, the no-signal current in a diode demodulation circuit permits a small amount of unrectified radio carrier signals to pass unrectified through the demodulation circuit. If the receiver employs a delayed or threshold type automatic gain control circuit (AGC) the unrectified carrier will be erroneously sensed by the AGC circuit and the gain of the receiver reduced as though a stronger signal were being received. This results in a reduction in available receiver gain, and in television receivers produces an undesirable change in picture contrast when receiving carriers of a strength above the threshold but below the knee of the AGC circuit characteristic.

It is, therefore, an object of the present invention to provide a diode detector circuit which will greatly increase the sensitivity of a diode detector to weak signals, thus permitting operation of the receiver under weak signal conditions which previously have not produced satisfactory reception, and to do this with an insignificant increase in the cost of the receiver.

Briefly, and in accordance with the present invention, radio receiver sensitivity is increased by applying a direct current potential between the diode cathode and plate in such a polarity and magnitude which is just sufficient to reduce the "spurious" or "no-signal" current to zero.

It is another object of the present invention to provide an improved radio receiving system employing a diode demodulator circuit which has increased sensitivity for weak signals over prior art arrangements.

It is a further object of the present invention to correct for the characteristic spurious current of diodes used in radio detection circuits.

In accordance with the present invention, the deleterious effects produced by "spurious" or "no-signal" current in diode signal demodulating circuits is overcome by providing a source of direct current potential in circuit therewith of such polarity and amount as to prevent the development of no-signal potential across the diode or load circuit; this potential reduces the no-signal current to substantially zero and in a manner which will not otherwise interfere with signal demodulation.

A more complete understanding of the present invention will be obtained through a reading of the following specification, especially when considered in connection with the accompanying drawings, in which.

Figures 1, 2, 3, 4:
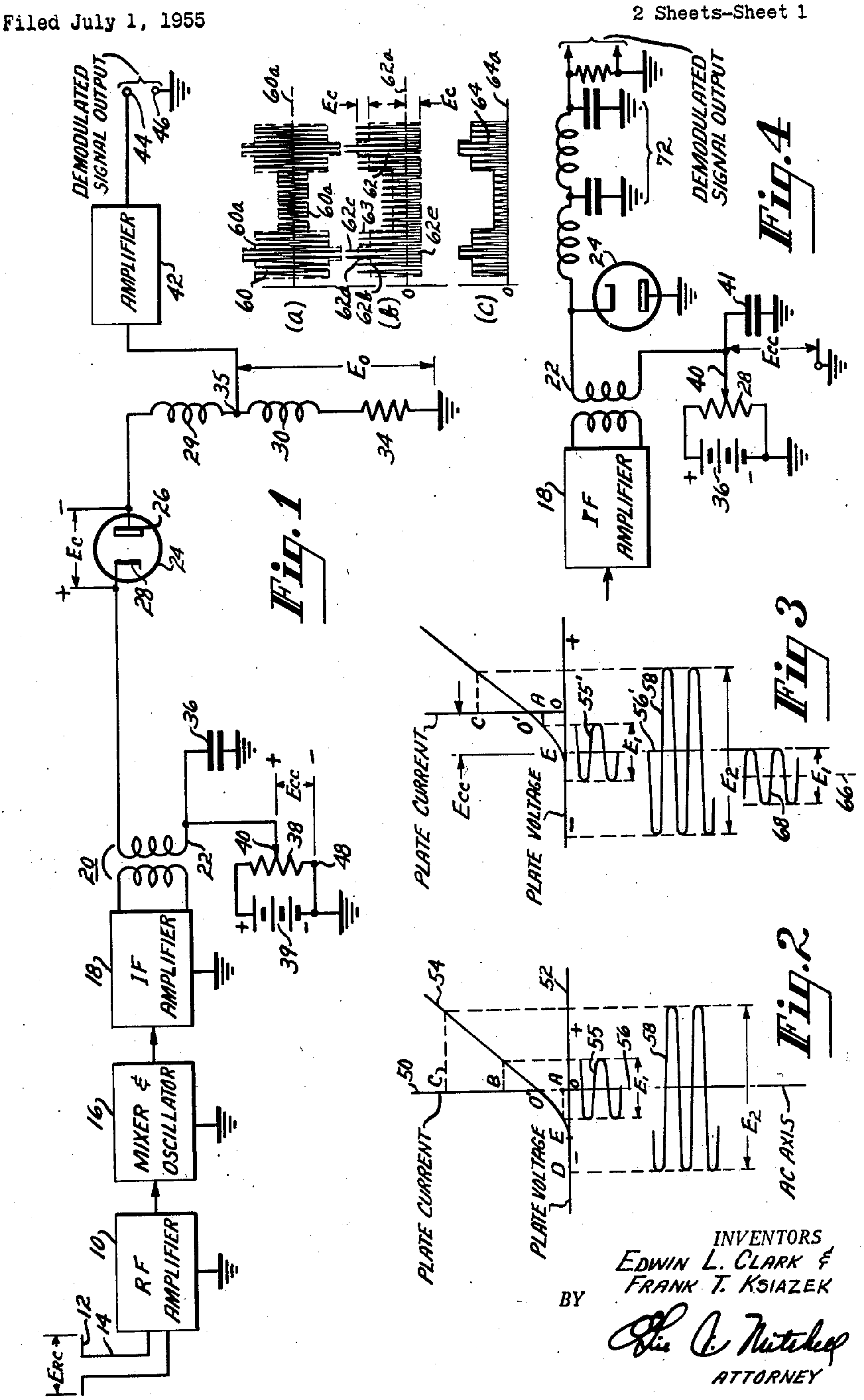
Fig. 1 is a combination block and schematic diagram of one form of radio receiving system embodying the novel features of the present invention.
Fig. 2 is a graphical representation of a typical diode signal transfer characteristic along with the illustration of prior art methods of applying radio signals to the characteristic for signal demodulation purposes.
Fig. 3 is a graphical illustration of the methods employed by the present invention in applying radio signals to the typical diode transfer characteristic of Fig. 1 to achieve higher receiver sensitivity.
Fig. 4 is a combination block and schematic diagram of still another form of radio carrier diode demodulator circuit embodying the novel features of the present invention.

Turning now to Fig. 1, there is shown a typical radio receiving system embodying the novel features of the present invention. A radio frequency (R. F.) amplifier 10 is supplied with modulated R.–F. carrier signals from an antenna 12 by means of a transmission line 14. The amplitude of radio carrier intercepted by the antenna 12 is indicated by the alternating voltage designation $E_{RC}$. Amplified signal energy from the amplifier 10 is applied to the mixer and oscillator means 16 which converts the received R.–F. signal into an intermediate frequency (I. F.) signal which is applied to the I. F.

amplifier 18. The I. F. amplifier 18 is terminated in an I. F. transformer 20 whose secondary winding 22 is connected in a series diode type carrier demodulation circuit employing the diode 24. The diode 24 may be of the heater-cathode electron emissive type having a plate 26 and a cathode 28. The load circuit of substantial impedance for diode demodulator circuit comprises an indicator 29, an indicator 30 and a resistor 34 connected in series between the plate 26 and circuit ground. Output signal is developed at terminal 35 with reference to circuit ground. I. F. signal is applied to the diode through the connection of the secondary winding 22 of the I. F. transformers between cathode 28 and circuit ground through a capacitor 36. A direct current path from the diode cathode 28 to circuit ground is provided by the potentiometer 38 whose arm 40 is connected with the lower extremity of winding 22.

In accordance with the present invention and for reasons above mentioned and more fully described hereinafter, a source of direct current potential is connected across the potentiometer 38 so that the arm 40 may be adjusted along the potentiometer to provide a controllable voltage between the arm 40 and circuit ground of a magnitude $E_{cc}$. Demodulated signal appearing at terminal 35 in the diode load circuit is applied to an amplifier 42 which amplifies the demodulated signal for application to the output terminals 44 and 46.

In first considering the operation of the circuit arrangement illustrated in Fig. 1 and for the purpose of pointing out the problem solved by the present invention, it will be assumed that the arm 40 of potentiometer 38 is at the circuit ground extermity 48 of the potentiometer such that the cathode 28 of the diode 24 will be established substantially at circuit ground potential. With such an adjustment of the arm 40 the voltage $E_{cc}$ will be zero and the operation of the circuit in Fig. 1 will be conventional. Reference to Fig. 2 will aid in understanding the operation of the circuit in Fig. 1 in accordance with prior art teachings. Fig. 2 shows by graphical representation the relationship between the space current of the diode 24 (values of which are shown along the ordinate 50) for various voltages applied between the plate 26 and the cathode 28 (shown along the abscissa 52). The diode characteristic is shown by the curve 54. Under conditions of no-signal, that is, no alternating current signal voltage across the secondary winding 22 of the I. F. transformer 20, the conventional diode will sustain a spurious current of value 0′. As mentioned above, the value of this "spurious" or no-signal current is due at least in part to the difference in work functions of the materials comprising the cathode and plate electrodes of the diode as well as the relative termperatures of the electrodes. This spurious current flow will result in the appearance of a characteristic voltage $E_c$ across the diode, the magnitude of which will be a direct function of the value of the spurious current flow. If then a radio signal is received of a value $E_{rc}$ (at the antenna 12—Fig. 1) such that after amplification by the amplifiers 10 and 18 the peak-to-peak amplitude across the secondary winding 22 is $E_1$ (waveform 55), it will be apparent from Fig. 2 that the demodulated signal $E_o$ applied to the amplifier 42 will be substantially proportional to O′B—O′A along the ordinate 50. If the characteristic curve 54 of the diode were perfectly linear for values of low space current down to and including zero current at E, it would follow that the average value of current flowing as the result of the applied signal $E_1$ would be zero. This comes about because of the no-signal or spurious current in the diode 24 which establishes the axis 56 of the signal $E_1$ at a point along curve 54 where the increase in space current due to positive excursions of the signal $E_1$ is substantially equal to the decrease in current due to the negative excursions of the signal $E_1$. The curvature of the curve 54 at very low space current, however, will result in a very small value of average curent flow in the diode load circuit in response to received signal $E_1$. Since it is the changes in the average value of a received radio signal carrier which constitutes amplitude modulation of a radio carrier, the demodulated signal appearing at terminal 35 will be extremely small.

The effects of the zero signal plate current O′ upon demodulated signal output for larger peak-to-peak values of received radio carrier will be less objectionable when the ratio of the peak-to-peak value of the applied signal to twice the value OE along the abscissa 52 is large. This is illustrated by the signal waveform 58. The output signal from the demodulator circuit resulting from the signal 58 will be proportional to O′C—O′O which will yield a substantial signal output from the detector. Therefore, although the effects of the spurious current of the diode 24 is noticeable on higher amplitude signals it becomes serious only when attempting to detect small amplitude signals.

The effects of the no-signal or spurious current of the diode 24 is substantially overcome in accordance with the present invention by shifting the direct current potential value of the alternating current axis of the signal to be demodulated such that the axis substantially coincides with the zero space current condition of the diode characteristic. This is illustrated in Fig. 3. Here the axis 56′ of the signals 55 and 58 have been shifted to coincide with zero current plate voltage value E. This is accomplished in the circuit arrangement of Fig. 1 by adjusting the arm on the potentiometer 40 such that the value of voltage $E_{cc}$ is substantially equal to the value of voltage $E_c$ which appeared across the diode 24 when the arm 40 was established at circuit ground potential. Under these conditions any positive excursion of the signal $E_1$ will cause an increase in the average space current of the diode 24, whereas any negative excursion of the signal will not affect the average current flow. Thus, by shifting the axis 54′ by means of the correcting potential $E_{cc}$, unilateral conduction in the diode is established for even very low amplitude radio carrier signals. Larger signal amplitudes such as the signal 58 having a value $E_2$ in Fig. 3 will also produce a substantially larger demodulated output than would be produced in the absence of the correcting potential $E_{cc}$. For example, the detected output signal for signals of amplitude $E_1$ in Fig. 3 will be proportional to OA while for signals of amplitude $E_2$ the output signal will be proportional to the value OC. The value OA is considerably larger than the corresponding value of output plate current O′B—O′A shown in Fig. 2 for signals of amplitude $E_1$ while the value OC in Fig. 3 is substantially larger than the value O′C—O′A shown in Fig. 2 for values of signal $E_2$.

The spurious current or no-signal conditions appearing in the conventional diode demodulator circuit can, therefore, be seen to be very deleterious in that it limits the sensitivity of a receiver to the point where received signals after amplification will not be effectively demodulated unless the received signals as applied to the diode demodulating circuit have peak-to-peak value which is considerably in excess of twice the value of the characteristic or spurious potential appearing across the diode, or the load circuit, in the absence of a received signal.

In addition to limiting the sensitivity of a radio receiver, spurious current flow in a diode demodulator circuit can produce serious distortion of the received carrier modulation envelope. This is illustrated by waveforms (A), (B) and (C) in Fig. 1. The received amplitude modulated radio carrier signal developed across the winding 22 appears as shown by the waveform 60 at (A) in Fig. 1 with dotted line 60*a* representing the modulation envelope. Assuming the presence of spurious diode current such that a no-signal potential $E_c$ appears across the diode, the waveform of the output signal $E_o$ appearing at terminal 35 of the demodulator circuit will appear as shown by waveform 62 at (B), in which rectified carrier excursions are depicted. The dotted line 62*a* represents the D.-C. reference axis for the demodulated signal 62 while the true modulation envelope of the signal is depicted by the dotted line 62*b*. From this, it can be seen that upon demodulation a spurious R.-F. component is in effect added to the modulation envelope of the intelligence signal due to the spurious diode current. Thus, the peaks of rectified signal excursion at 62*c* are in excess of the normal modulation envelope peak 62*d* by an amount equal to the potential $E_c$. Similarly, although the level depicted by the line 62*a* should correspond to the axis of the received carrier in (A) of Fig. 1, the spurious excursions 62*e* extend below this level. After correcting for the spurious current flow in the diode circuit, in accordance with the present invention, the output waveform of the demodulator will appear as shown at (C) Fig. 1. Here the potential of point 35 with respect to circuit ground is made zero under the conditions of no-carrier thereby making the line 64*a* associated with the correct output waveform 64 at (C) correspond to zero carrier. Under these conditions the peak-to-peak amplitude of the demodulated signal will not be affected by a spurious carrier component appearing as part of the waveform as shown above at (B).

It is important in the practice of the present invention that the correcting potential $E_{cc}$ be just sufficient in value to establish a condition of zero current in the diode under conditions of zero signal. If the value of the correcting voltage $E_{cc}$ is made substantially greater than that necessary to establish zero current in the diode, the diode will in effect be reversed biased and the axis of the received radio carrier will be shifted in the direction depicted at 66 in Fig. 3 in connection with the waveform 68. With the value of $E_{cc}$ equal to F in Fig. 3, signals whose amplitude do not exceed the value $E_1$ will produce no conduction whatever in the diode and consequently will not be represented by a demodulated signal output. It is, therefore, important, in accordance with the present invention, that the value of the potential $E_{cc}$ be adjusted critically for best results. In practice it may be found that the sprious conduction current of different diodes will be different so that in a given demodulation circuit, replacement of one diode device by another may require adjustment of the correcting potential $E_{cc}$ used. Moreover, as a given diode device ages the value of no-signal current may change. This may require slight readjustment of the correcting potential in order to realize maximum sensitivity in the receiver. It is further of great importance that the source of correcting potential such as 38 and 39 be bidirectionally conductive so that the correction imposed on the diode is independent of signal strength and signal polarity.

Although means have been shown in the arrangement of Fig. 1 for correcting the spurious current of a diode detector when connected in a series type of signal demodulating circuit, correction of spurious diode current flow in accordance with the present invention is possible in shunt types of signal demodulating circuits as shown, for example, in the embodiment illustrated in Fig. 4. Those circuit components in Fig. 4 corresponding to elements shown in the arrangement illustrated in Fig. 1 have been given like reference numerals. In Fig. 4, however, the diode 24 is connected in shunt with the demodulation time constant circuit 72. The potential at the arm 40 of the potentiometer 38 again may be adjusted to deliver a correcting potential $E_{cc}$ equivalent to the characteristic potential produced across the diode 24 by reason of the aforementioned characteristic zero signal spurious current flow.

Figure 6:
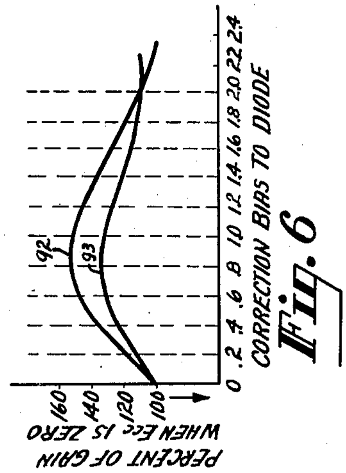
Fig. 6 is another graphical display of how radio receiver performance is improved through the practice of the present invention.
Figure 5:
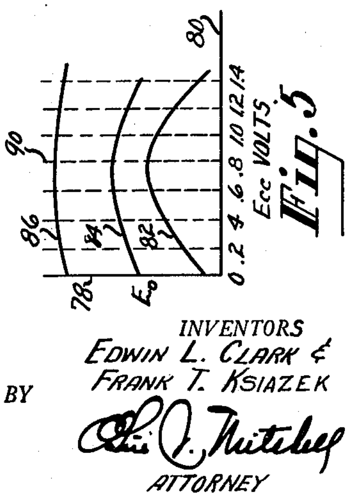
Fig. 5 is a graphical representation of the manner in which overall operation of a radio receiver is improved through the practice of the present invention.

The benefits to be derived from the practice of the present invention are graphically illustrated in Figs. 5 and 6. In Fig. 5 a plot is shown between the demodulator output voltage $E_o$ (indicated in Fig. 1) along the ordinate 78 against values of correcting potential $E_{cc}$ indicated along the abscissa 80, for different values of received input signal $E_{rc}$ (at the antenna 12) depicted by the solid line curves 82, 84 and 86, respectively. The curves 82, 84 and 86 correspond to respectively higher input signals $E_{rc}$. The data upon which the graphic display of both Figs. 5 and 6 are based is typical of the commercial 6AS6 diode. It can be seen from the curve 82 in Fig. 5 that for very low values of input signal $E_{rc}$ the output signal $E_o$ significantly increases for increasingly higher values of correcting voltage $E_{cc}$ up to an optimum value of .8 volt indicated by dotted line 90. For correcting voltage above this value the output of the demodulator circuit begins to fall. It may, therefore, be concluded that the characteristic potential of the particular diode attributable to spurious diode current flow in the circuit is substantially .8 of a volt. For higher values of input signal such as depicted by the solid line curve 84 the improvement offered by the present invention is not as appreciable. This is due simply to the fact that the characteristic potential appearing across the diode as a result of spurious current flow is a smaller percentage of the peak-to-peak signal delivered to the diode by the intermediate frequency amplifier 18. Solid line curve 86 representing an even higher signal carrier strength further demonstrates this characteristic.

In radio receivers of the general type designated for use in areas where the signal-to-noise ratio at the antenna 12 is average, a practical improvement in receiver sensitivity of two to three times may be expected when practicing the present invention. In most noise areas where atmospheric conditions for the reception of radio signals are more favorable a practical increase in useful receiver sensitivity of 7 to 10 times may be realized. The graph of Fig. 6 further illustrates the characteristics of the present invention already discussed in connection with Fig. 5. Here the relation between the correction bias applied to the diode detector device and the percent of gain for spurious current through the diode is illustrated. The curve 92 shows that for an input signal whose peak-to-peak value produces an output signal of .15 volts at the detector, the gain of the receiver is optimized when the correction bias to the diode is established at .8 volt. Here the receiver gain is approximately 150% greater than the gain of the receiver when no correction bias is applied. For a larger signal input to the receiver resulting in .3 volt output at the detector, the receiver gain in increased only 130% by reason of the application of an optimum correction voltage.

Figure 7:
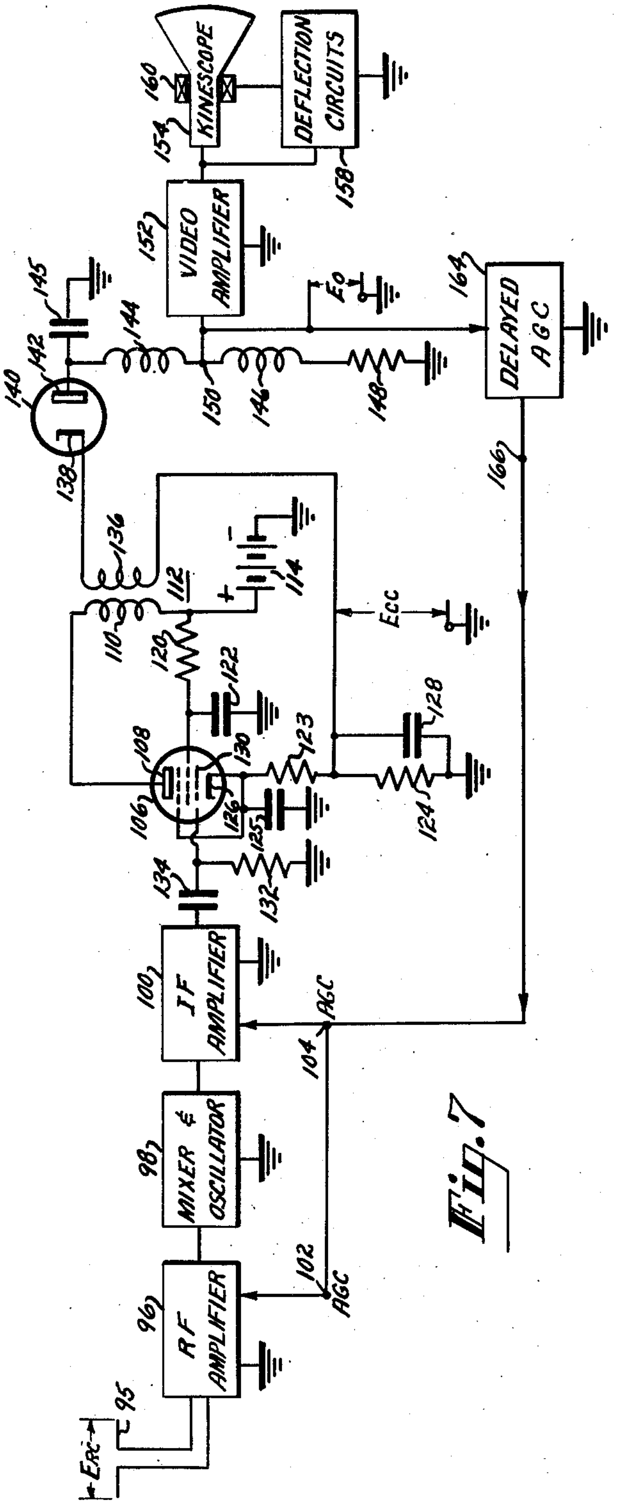
Fig. 7 is a combination block and schematic diagram of a television receiver circuit embodying the novel features of the present invention.

The advantages of the present invention are particularly noteworthy in radio receivers employing automatic gain control as for example in home type television receivers. A circuit diagram of such a receiver is depicted in Fig. 7. Here a radio carrier modulated by television signal information is intercepted by the antenna 95 and applied to the R. F. amplifier 96. The output signal from the R. F. amplifier 96 is conventionally applied to a superheterodyne mixer and oscillator stage 98 which, in turn, delivers intermediate frequency signal to the I. F. amplifier 100. Both the R. F. amplifier 96 and the I. F. amplifier 100 are indicated as being adapted for gain control by an automatic gain control potential which may be applied to the automatic gain control (AGC) input terminals 102 and 104, respectively.

The output I. F. amplifier of the receiver, shown in Fig. 7, is shown separate from the I. F. amplifier means included in the block 100 in order to illustrate a preferred form of the present invention. The output I. F. amplifier is shown based upon pentode 106 having its anode 108 connected through the primary winding 110 of an I. F. transformer 112 to a source of positive potential delivered by the power supply means 114. Screen potential for the pentode 106 is derived from the source 114 through the decoupling resistor 120 which is by-passed to circuit ground by means of capacitor 122. The output I. F. amplifier is provided with cathode bias developed across resistors 123 and 124 connected in series with one another between cathode 126 and circuit ground. Bypass capacitor 128 is connected in shunt with the cathode bias resistor 124 in a conventional manner. Bypass capacitor 125 may also be employed to bypass the entire cathode bias resistance comprising the series combination of resistors 123 and 124. The control electrode 130 is connected through a ground return resistor 132 to circuit ground. Intermediate frequency signal is coupled to the control electrode 130 from the I. F. amplifier 100 through the coupling capacitor 134. The upper terminal of the secondary winding 136 on the I. F. output transformer 112 is connected to the cathode 138 of demodulator diode 140. The anode or plate 142 of the diode 140 is connected through a conventional video demodulating load circuit 144, 146 and 148 to circuit ground. An I. F. bypass condenser 145 is connected in parallel with the load circuit. Demodulated video signal is coupled from the point 150 to a conventional video amplifier 152 which is connected in driving relation to a kinescope 154. Conventional cathode ray beam deflection circuits are shown at 158 connected to deflection yoke 160. A conventional form of delayed AGC circuit is shown at 164 connected for response to the demodulated signal delivered to the video amplifier 152. AGC potential delivered at the output terminal 166 of the AGC circuit is applied to the AGC terminals 102 and 104 of the RF and IF amplifiers. It is important in accordance with the present invention that the AGC potential not be applied for the control of the gain of the I. F. amplifier tube 86, as will be brought out hereinafter.

In accordance with the present invention, spurious current of the diode 140 is corrected by the means of a correcting potential $E_{cc}$ developed across at least a portion 124 of the total cathode bias resistance for the pentode 106 in accordance with the principles disclosed and discussed in connection with the showings of Figs. 1, 2 and 3. The value of the series combination comprising resistors 123 and 124 is selected for proper biasing of the pentode 86. However, the cathode resistor 124 should be either selected with great accuracy or made adjustable so that the potential developed across it will be no more than is necessary to reduce the spurious current flow in the diode to zero. Since the control electrode of the pentode 106 is not supplied with a varying gain control potential, the cathode current passing through the resistor 124 will remain substantially constant in the face of variations in signal strength. Should for any reason the anode potential applied to the pentode 106 tend to change, the cathode current through the resistor 124 will be affected only slightly due to the constant current characteristics of the pentode. This feature is of particular importance in commercial television receivers where the anode potential supply to the pentode 106 may tend to vary in accordance with fortuitous changes in the receiver power supply output.

Figure 8:
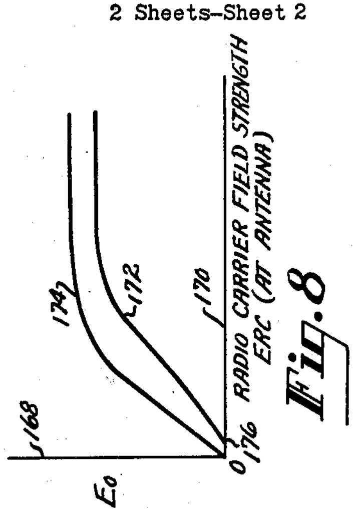
Fig. 8 is a graphical representation of the improvement offered by the present inventions in radio receivers employing an automatic gain control circuit.

In addition to increased sensitivity provided by the present invention in the arrangement illustrated in Fig. 4, there will be realized a noticeable improvement in picture contrast stability during the reception of television signals which are of insufficient amplitude to bring into operation the delayed AGC circuit 164. The advantages of the present invention when embodied in a television receiver having AGC and of the type shown in Fig. 7 are illustrated in the graph of Fig. 8 which is a plot of output voltage $E_0$ available at terminal 150 in Fig. 7 presented along the ordinate 168 against radio carrier field strength $E_{RC}$ (at antenna 95) presented along the abscissa 170 for two different circuit conditions depicted by the solid line curves 172 and 174. Curve 172 illustrates conventional receiver characteristics typifying the circuit illustrated in Fig. 7 without the practice of the present invention, while the curve 174 illustrates the improved characteristics achieved through the practice of the present invention. In Fig. 8 it is observed that substantially no output signal is delivered by the demodulator to the video amplifier for radio carrier field strengths below the value depicted by the point 176 along the abscissa. Such a characteristic will be typical of the circuit in Fig. 7 if the lower extremity of the I. F. transformer secondary 136 is conventionally connected directly with circuit ground and no spurious current correcting voltage is applied to the diode. However, the curve 174 characterizing the operation obtained in the practice of the present invention clearly shows improved sensitivity. Moreover, as previously illustrated in Fig. 1, at (*b*), if the spurious no-signal current of the diode 140 is not corrected, a residual component 62 of undetected carrier will be superimposed on the video waveform delivered to the AGC circuit 164. This will cause the AGC circuit to develop an automatic gain control potential corresponding to a value of signal greater than that actually received, thereby reducing the gain of the receiver by virtue of misinformation to the automatic gain control circuit. This will in turn produce a greater change in television picture contrast as the automatic gain control circuit is caused to operate over the upwardly sloping and bending portions of curve 172 in Fig. 5 than results if the spurious current of the diode 140 is corrected in accordance with the present invention. As noted above, it may be desirable to alter the value of resistor 124 or otherwise change the value of $E_{cc}$ imposed on the demodulator circuit as a given diode ages or when it is replaced for any reason.

Having thus described our invention, what is claimed is:

1. In a superheterodyne signal receiving apparatus, for receiving and demodulating a radio carrier amplitude modulated by television signals, the combination of: a radio frequency amplifier means for accepting a radio carrier to be demodulated; a superheterodyne mixer-oscillator means; an intermediate frequency amplifier means; means operatively connecting said aforementioned means with one another to deliver an intermediate frequency version of said radio carrier at the output of said intermediate frequency amplifier means; a circuit ground means common to said mixer-oscillator and both amplifier means; a plurality of amplifier stages included in said intermediate frequency amplifier means, one of said amplifier stages comprising an amplifier device having electrodes corresponding to an anode, cathode and control electrode and characterized by the ability to establish an anode to cathode operating current flow the value of which is substantially independent of the polarizing potential caused to appear between said anode and cathode over wide ranges of amplifier operating conditions; an electronic diode device having an anode and a cathode between which appears a characteristic potential of substantially fixed value when said diode is connected across a galvanically conductive load circuit, said characteristic potential being the result of spurious current flow in said diode in the absence of received radio carrier; a galvanically conductive time constant carrier demodulation load circuit connected between said anode and cathode of a type suitable to form a demodulator circuit for demodulating said radio carrier, said demodulator circuit having signal input and signal output terminals; means connected with said intermediate amplifier and said input terminals operatively applying output signal from said intermediate amplifier to said input terminals; resistance means galvanically connected between said amplifier device cathode and circuit ground in conductive relation to current passed by said amplifier device cathode, the resistance value of said resistance means being related to current flow from said cathode such that a unidirectional potential is developed across said resistance means substantially equal to said characteristic potential; galvanic circuit connecting means connected with said resistance means and said demodulator circuit such that said unidirectional potential acts to oppose said characteristic diode potential to prevent current flow through said diode at all times except when receiving said radio carrier.

2. In a radio receiving apparatus for receiving and demodulating a radio carrier amplitude modulated by television signals, the combination of: a radio frequency amplifier means; a superheterodyne mixer-oscillator means; an intermediate frequency amplifier means; means operatively connecting said aforementioned means to deliver an intermediate frequency version of said modulated radio carrier at the output of said intermediate frequency amplifier means; a circuit ground means common to said mixer-oscillator and both of said amplifier means; a plurality of amplifier stages included in said intermediate frequency amplifier means, one of said amplifier stages comprising an amplifier device having electrodes corresponding to an anode, cathode and control electrode and characterized by an anode to cathode operating current flow the value of which is substantially independent of the polarizing potential caused to appear on said anode over wide ranges of amplifier conditions; a diode means having a plate and cathode which when connected with a demodulator load circuit produces a spurious current flow therethrough resulting in a characteristic no-signal potential appearing between said plate and cathode; a galvanically conductive time constant carrier demodulation load circuit connected between said diode plate and cathode of a type suitable for demodulating radio carrier signals, said load circuit and said diode forming a demodulation circuit having input and output terminals; resistance means galvanically connected between said amplifier device cathode and circuit ground in conductive relation to current passed by said cathode, the resistance value of said resistance means being related to said cathode current flow such that a unidirectional potential is developed across said resistance means substantially equal to said diode characteristic no-signal potential; galvanic circuit connecting means connected with said resistance means and said demodulator circuit with such electrical polarity that said unidirectional potential developed across said resistor acts within said demodulator circuit to oppose said characteristic diode potential; an automatic gain control potential input connection means connected with at least one of said amplifier stages other than said one whose cathode is connected with said resistance means, for controlling the gain of said intermediate frequency amplifier in accordance with an automatic gain control potential; an automatic gain control potential developing means operatively connected with said demodulator circuit output terminals responsive to signals developed across said demodulator output terminals to develop an automatic gain control potential; and means coupled with said gain control potential developing means and to all intermediate frequency amplifier automatic gain control potential input connection means applying automatic gain control potential to said intermediate frequency amplifier with such electrical sense as to minimize amplitude variation in the output signals of said intermediate frequency amplifier in the face of variations in the amplitude of received radio carrier.

3. In a radio signal receiving apparatus for receiving and demodulating a radio carrier amplitude modulated by intelligence signals, the combination of: a signal amplifier means for amplifying signal prior to demodulation; a circuit ground means operatively connected in said apparatus to supply an electrical reference for the electrical circuitry of said receiver; an amplifier stage comprising an amplifier device having electrodes corresponding to an anode, cathode and control electrode and characterized by its ability to establish an anode to cathode operating current flow the value of which is substantially independent of the polarizing potential caused to appear between said anode and cathode over wide ranges of amplifier operating conditions; a diode device having an anode and a cathode between which appears a characteristic potential of substantially fixed value when said diode is connected across a galvanically conductive load circuit, said characteristic potential being the result of spurious current flow in said diode in the absence of received radio carrier; a galvanically conductive time constant carrier demodulation load circuit connected between said anode and cathode of a type suitable to form a demodulator circuit for demodulating said radio carrier, said demodulator circuit having signal input and signal output terminals; means operatively connecting said amplifier means to said input terminals to apply output signal from said amplifier means to said input terminals; resistance means galvanically connected between said amplifier device cathode and circuit ground in conductive relation to current passed by said amplifier device cathode, the resistance value of said resistance means being related to the magnitude of current flow from said cathode such that a unidirectional potential is developed across said resistance means substantially equal to said characteristic potential; and galvanic circuit connecting means connected with said resistance means and said demodulator circuit such that said unidirectional potential developed across said resistance means acts within said demodulator circuit to oppose said characteristic diode potential.

References Cited in the file of this patent

UNITED STATES PATENTS 2,157,856 Koch ------------------- May 9, 1939

OTHER REFERENCES

Radio Receiver Design (Book), by Sturley (4th ed.), Wiley, 1947, vol. 1, chapter 8, "Detection," pp. 339–403. Only pages 354, 356 and 357.